US009640982B2

(12) United States Patent
Chi et al.

(10) Patent No.: US 9,640,982 B2
(45) Date of Patent: May 2, 2017

(54) OVER-VOLTAGE PROTECTION SYSTEM AND METHOD

(71) Applicant: GENERAL ELECTRIC COMPANY, Schenectady, NY (US)

(72) Inventors: Song Chi, Clifton Park, NY (US); Dong Dong, Schenectady, NY (US); Rixin Lai, San Jose, CA (US)

(73) Assignee: General Electric Company, Niskayuna, NY (US)

( * ) Notice: Subject to any disclaimer, the term of this patent is extended or adjusted under 35 U.S.C. 154(b) by 405 days.

(21) Appl. No.: 14/533,762

(22) Filed: Nov. 5, 2014

(65) Prior Publication Data
US 2016/0126726 A1  May 5, 2016

(51) Int. Cl.
*H02H 9/00* (2006.01)
*H02H 7/10* (2006.01)
(Continued)

(52) U.S. Cl.
CPC ............. *H02H 7/10* (2013.01); *H02H 9/041* (2013.01); *H02J 3/36* (2013.01); *Y02E 60/60* (2013.01)

(58) Field of Classification Search
USPC .......................................................... 361/56
See application file for complete search history.

(56) References Cited

U.S. PATENT DOCUMENTS 4,414,599 A * 11/1983 Kobayashi ......... H03K 17/0824
361/56

4,536,816 A * 8/1985 Matsumura ............. H02M 1/00
361/100

(Continued)

FOREIGN PATENT DOCUMENTS

CN       201075680 Y    6/2008
CN       102593796 A    7/2012
(Continued)

OTHER PUBLICATIONS

European Search Report issued in connection with corresponding EP Application No. 15191643.4 on Mar. 10, 2016.
(Continued)

*Primary Examiner* — Ronald W Leja
(74) *Attorney, Agent, or Firm* — Nitin N. Joshi (57) ABSTRACT

An over-voltage protection system includes an electronic valve connected across two terminals of a circuit and an over-voltage detection circuit connected across one of the plurality of semiconductor devices for detecting an over-voltage across the circuit. The electronic valve includes a plurality of semiconductor devices connected in series. The over-voltage detection circuit includes a voltage divider circuit connected to a break-over diode in a way to provide a representative low voltage to the break-over diode and an optocoupler configured to receive a current from the break-over diode when the representative low voltage exceeds a threshold voltage of the break-over diode indicating an over-voltage condition. The representative low voltage provided to the break-over diode represents a voltage across the one semiconductor device. A plurality of self-powered gate drive circuits are connected to the plurality of semiconductor devices, wherein the plurality of self-powered gate drive circuits receive over-voltage triggering pulses from the optocoupler during the over-voltage condition and switch on the plurality of semiconductor devices to bypass the circuit.

20 Claims, 4 Drawing Sheets

(51) Int. Cl.
*H02H 9/04* (2006.01)
*H02J 3/36* (2006.01)

(56) References Cited

U.S. PATENT DOCUMENTS

| | | | | |
|---|---|---|---|---|
| 4,651,251 | A * | 3/1987 | Thiele | H03K 17/0824 327/465 |
| 4,947,282 | A * | 8/1990 | Kobayashi | H03K 17/0824 361/56 |
| 5,452,196 | A * | 9/1995 | Itoh | H02H 7/1206 363/54 |
| 6,021,035 | A | 2/2000 | Larsen et al. | |
| 6,205,039 | B1 * | 3/2001 | åstrom | G01R 31/40 363/50 |
| 7,199,990 | B2 | 4/2007 | Hunner | B60L 3/00 361/91.1 |
| 9,178,349 | B2 * | 11/2015 | Dong | H02H 3/16 |
| 2003/0016073 | A1 | 1/2003 | Gelman | |
| 2008/0174926 | A1 | 7/2008 | Evans et al. | |
| 2012/0280665 | A1 | 11/2012 | Su et al. | |
| 2013/0301173 | A1 | 11/2013 | Densham | |
| 2013/0313906 | A1 * | 11/2013 | Gupta | H02M 1/00 307/39 |
| 2013/0335863 | A1 | 12/2013 | Rongve et al. | |
| 2014/0362480 | A1 * | 12/2014 | Veil | B25J 9/1674 361/18 |
| 2015/0070802 | A1 * | 3/2015 | Dong | H02H 3/16 361/49 |
| 2016/0126726 | A1 * | 5/2016 | Chi | H02J 3/36 361/56 |
| 2016/0254660 | A1 * | 9/2016 | Dawley | H02H 3/22 |

FOREIGN PATENT DOCUMENTS

| | | |
|---|---|---|
| WO | 2011124260 A1 | 10/2011 |
| WO | 2014008415 A1 | 1/2014 |

OTHER PUBLICATIONS

H.M. Lawatsch et al., "Protection of Thyristors Against Overvoltage With Breakover Diodes", IEEE Transactions on Industry Applications, vol. 24, Issue 3, pp. 444-448, May/Jun. 1988.

R. Lai, "Phase 2 Final Report: MSDC Electrical System for Deepwater Subsea Process", General Electric Global Research, pp. 1-353, Nov. 19, 2013.

* cited by examiner

OVER-VOLTAGE PROTECTION SYSTEM AND METHOD

STATEMENT REGARDING FEDERALLY SPONSORED RESEARCH & DEVELOPMENT

This invention was made with Government support under sub contract number 08121-2901-01 of prime contract number DE-AC26-07NT42677 awarded by the United States Department of Energy. The Government has certain rights in the invention.

BACKGROUND

Embodiments of the present technique relate to a high-voltage protection system and method. Specifically, the embodiments relate to bypassing a high voltage circuit in the event of a fault.

As oil and gas fields in shallow waters are depleting, operators are tapping offshore reservoirs in deeper water with more subsea turbomachinery equipment, e.g., pumps and compressors, which are usually power intense and require the drive train comprised of electric variable speed drive (VSD) and motor. Therefore, delivery of electric power from a remote onshore utility grid or power generation on floating platform is imperative to secure reliable production and processing of oil and gas in subsea locations. Typically the transmission power is on the order of tens of megawatts for medium to large oil/gas fields.

Direct Current (DC) transmission is more efficient over longer distances than alternating current (AC) counterpart. Medium voltage (MV) or high voltage (HV) DC transmission typically requires power electronic converters which are capable of converting between HVAC and HVDC. In conventional converter topologies, each switch of the converter is designed to handle high voltages which may range from tens of kilovolts to hundreds of kilovolts depending upon the application needs. Such switches are typically arranged with series connection of multiple semiconductor devices such as insulated gate bipolar transistors (IGBTs) and thyristors. Another method is to use switches within modules of lower voltage rating and achieving the high voltages required by connecting as many modules in series as the application requires. Due to the special application in subsea, receiving-end converters need to be designed on a modular-basis which is easy to transport, marinize, install, and retrieve.

The Modular Stacked DC (MSDC) subsea power delivery architecture has been developed to transmit and distribute electric power over long tieback distance to the loads on seabed. Both sending- and receiving-end modules are connected in series; and the system is operated as a constant current source. Over-voltage will occur where the path of flowing current is open. Under fault conditions, protection of each module from over-voltage damaging requires parallel connection of protecting devices which can bypass the module in a timely fashion. Furthermore, in some instances one may need to bypass a complete DC link or part of the DC link.

Over-voltage detection is required to be fast so that protection will take place upon it effectively. For the bypass devices consisting of series-connected thyristors in MSDC, the detection delay time is expected to be less than 1 microsecond. Also, isolation from high potential components should be carefully undertaken. Usually the nominal operating voltage of bypass device in the field is higher than 10 kV. For example, it is about 11 kv between inputs of receiving-end power modules while above 30 kV in switchyard. Therefore, it poses challenge of design to meet isolation requirement.

Therefore, it is desirable to determine a method and a system that will address the foregoing issues.

BRIEF DESCRIPTION

In accordance with an embodiment of the present technique, an over-voltage protection system is provided. The over-voltage protection system includes an electronic valve connected across two terminals of a circuit, the electronic valve having a plurality of semiconductor devices connected in series. The over-voltage protection system also includes an over-voltage detection circuit connected across one of the plurality of semiconductor devices for detecting an over-voltage across the circuit. The over-voltage detection circuit includes a voltage divider circuit connected to a break-over diode in a way to provide a representative low voltage to the break-over diode, the representative low voltage representing a voltage across the one semiconductor device. The over-voltage detection circuit further includes an optocoupler configured to receive a current from the break-over diode when the representative low voltage exceeds a threshold voltage of the break-over diode indicating an over-voltage condition. The over-voltage protection system further includes a plurality of self-powered gate drive circuits connected to the plurality of semiconductor devices, wherein the plurality of self-powered gate drive circuits receive over-voltage triggering pulses from the optocoupler during the over-voltage condition and switch on the plurality of semiconductor devices to bypass the circuit.

In accordance with another embodiment of the present technique, a method of bypassing a circuit during an over-voltage is provided. The method includes connecting an electronic valve across two terminals of a circuit and providing an over-voltage detection circuit across one of the plurality of semiconductor devices to detect an over-voltage across the circuit. The electronic valve is formed by connecting a plurality of semiconductor devices in series. Furthermore, detecting the over-voltage includes providing a representative low voltage representing a voltage across the one semiconductor device to a break-over diode by connecting a voltage divider circuit across the semiconductor device and receiving a current at an optocoupler from the break-over diode when the representative low voltage exceeds a threshold voltage of the break-over diode indicating an over-voltage condition. The method further includes utilizing the optocoupler for providing over-voltage triggering pulses to self-powered gate drive circuits of the plurality of semiconductor devices for turning on the plurality of semiconductor devices of the electronic valve to bypass the circuit during the over-voltage condition.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of terms such as "including," "comprising," or "having" and variations thereof herein are meant to encompass the items listed thereafter and equivalents thereof as well as additional items. The term "module" or "controller" refers to software, hardware, or firmware, or any combination of these, or any system, process, or functionality that performs or facilitates the processes described herein.

Additionally, for purposes of explanation, specific numbers, materials, and configurations are set forth in order to provide a thorough understanding of various embodiments of the invention. The skilled artisan will recognize the interchangeability of various features from different embodiments. Similarly, the various method steps and features described, as well as other known equivalents for each such methods and features, can be mixed and matched by one of ordinary skill in this art to construct additional assemblies and techniques in accordance with principles of this disclosure.

Figure 1:
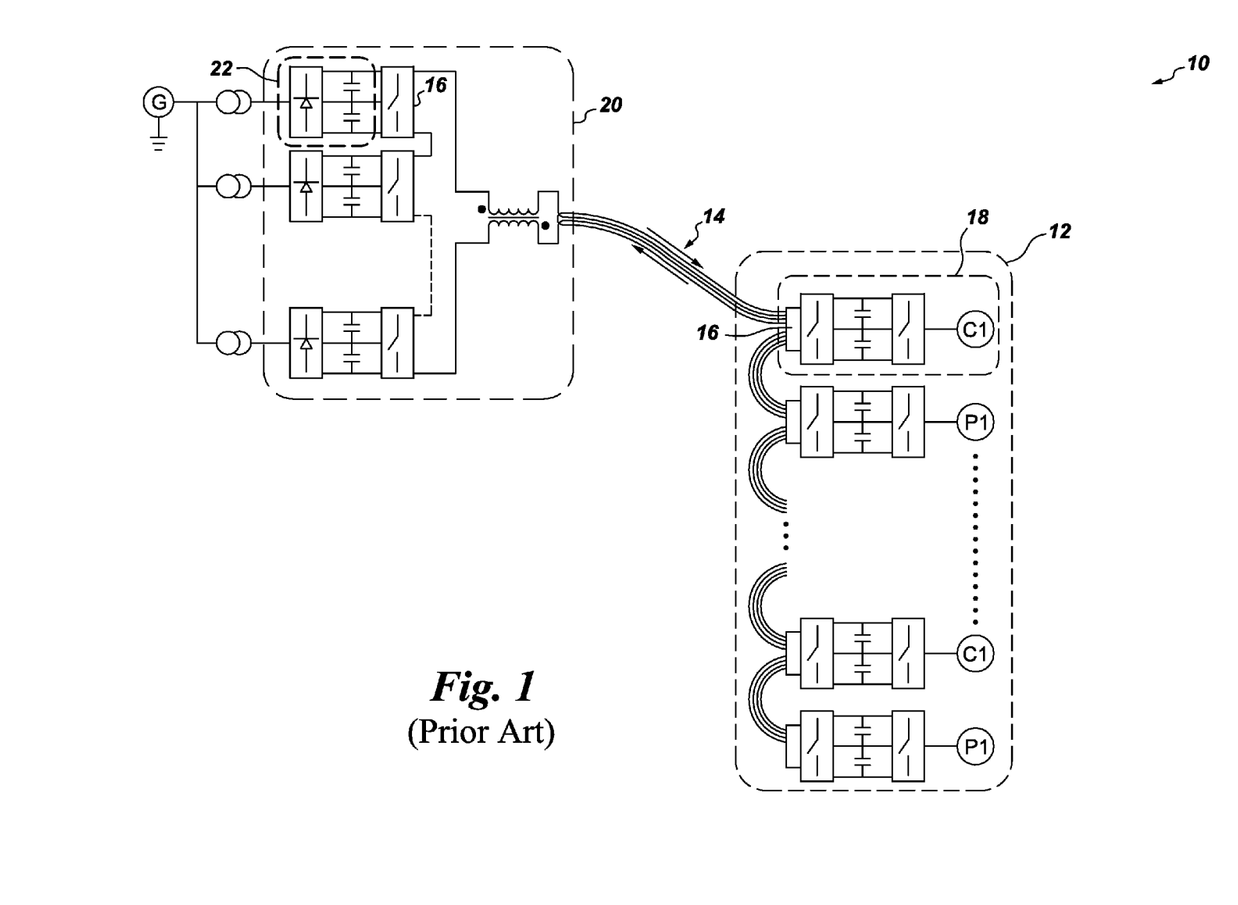
FIG. 1 is a simplified diagram illustrating a known sub-sea power transmission/distribution system with bypass devices on the sub-sea side of the system.

FIG. 1 illustrates a subsea power transmission and distribution system 10 that employs a MSDC architecture. As can be seen, on the output side 12, the modular converters are connected in series 11. Such a topology is valid not only for a MSDC system, but for any system where the transmission line current 14 is controlled to be stiff, such as, for example, a classic line commutated HVDC system.

A bypass device 16, such as shown in FIG. 1 may be required for each remote load and/or variable frequency drive (VFD) 18. Each bypass device 16 is connected in parallel to a respective remote load 18. The bypass devices 16 provide a bypass path to the transmission line current 14 in the event of open-circuit fault VFDs or loads 18 to ensure point-to-point power flow is maintained.

Bypass devices 16 ensure that continuous point-to-point power flow is maintained. Fast operation of the bypass devices 16 is desirable to ensure reliable protection against open-circuit fault transients. Furthermore, in some instances, it may be necessary to bypass part of the DC link on input side 20 when there is a fault in one or more the input converters 22. In such cases, bypass devices 16 ensure operation of the DC link with reduced DC voltage.

Figure 2:
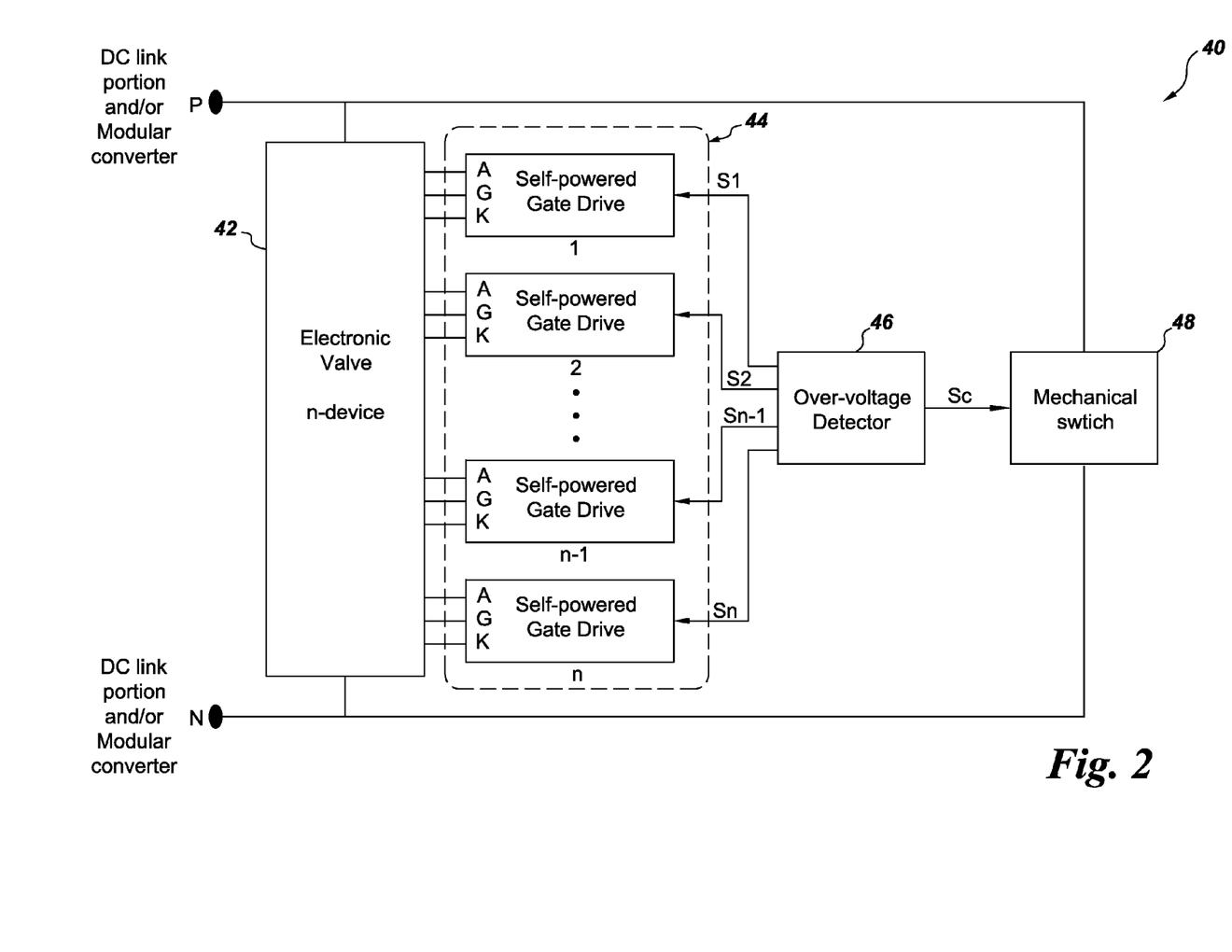
FIG. 2 is a bypass device circuit in accordance with one embodiment of the present technique.

FIG. 2 shows a bypass device circuit 40 in accordance with an embodiment of the present technique. The bypass device circuit 40 includes a mechanical switch 48 and an electronic valve 42 of a plurality of semiconductor devices which are connected in series and. The semiconductor devices may include thyristors, insulated gate bipolar transistors (IGBT) or any other controllable semiconductor devices. Each of the semiconductor devices is controlled by a self-powered gate drive circuit 44.

The mechanical switch 48 and electronic valve 42 are connected across terminals P and N. The terminals P and N may form part of a DC link and/or may be connected to a modular converter as in FIG. 1. During normal operation, electronic valve 42 and mechanical switch 48 are open circuited so the power is transferred to modular converter. However, in the case of an over-voltage across terminals P-N, first electronic valve 42 having series semiconductor devices is activated which short circuits terminals P-N and thus, bypasses the modular converter or any other circuit across terminals P-N. Second, mechanical switch 48 is also activated which then bypasses the circuit such as any modular converter across terminals P-N for a long duration or till the fault is cleared.

An over-voltage detection circuit 46 detects over-voltage across terminals P-N and accordingly sends over-voltage signals simultaneously to self-powered gate drive circuits 44 so as to activate and turn on the semiconductor devices simultaneously. It should be noted that self-power gate drive circuits refer to gate drive circuits which do not need any external power supply rather they take power from the semiconductor switches to which they are connected. In one embodiment, only one over-voltage detection circuit is utilized instead of a plurality to detect the over-voltage and to trigger the activation of semiconductor devices. Since the over-voltage detection circuit 46 activates all semiconductor devices simultaneously, it leads to little voltage unbalance on each semiconductor device during transients and highly improves the reliability of overall bypass device 40. Over-voltage detection circuit 46 also sends an over-voltage signal to mechanical switch 48 so as to switch it on and bypass any circuit across terminals P-N for a long duration. Generally, mechanical switches take some time to turn on compared to semiconductor devices. Thus, till the time mechanical switch 48 turns on, semiconductor devices in valve 42 bypasses any circuit across terminals P-N. Once the bypass current smoothly diverts from electronic valve 42 to mechanical switch 48, the electronic valve 42 will be turned off automatically as there won't be any current in it. Mechanical switch 48 can be a high-voltage direct current circuit breaker to bypass faulty components over a long period of time. Its conduction losses are much smaller than that of electronic valve. During normal operation i.e., when there is no over-voltage condition both mechanical switch 48 and electronic valve 42 do not conduct and thus, terminals P-N are not short circuited and any circuit across terminals P-N is not bypassed. The bypass device circuit 40 may also include a controller (not shown) to control the operation of various components such as electronic valve 42, self-controlled gate drives 44, overvoltage detection circuit 46 and mechanical switch 48.

In one embodiment, the over-voltage detection circuit 46 includes a low voltage break-over diode (BOD) which is robust and insensitive to noises. Since the low voltage (e.g., 1 to 100 v) BODs are available in a wide variety of voltage ranges, it helps in precisely setting up over-voltage trigger level for associated over-voltages. It should be noted that the term "low voltage" refer to a voltage which is which is significantly lower than the voltage across a semiconductor switch when it is open circuited. Furthermore, use of low voltage BODs results in noise-insensitive over-voltage detection, high repeatability of bypass performance and accuracy of over-voltage protection.

Figure 3:
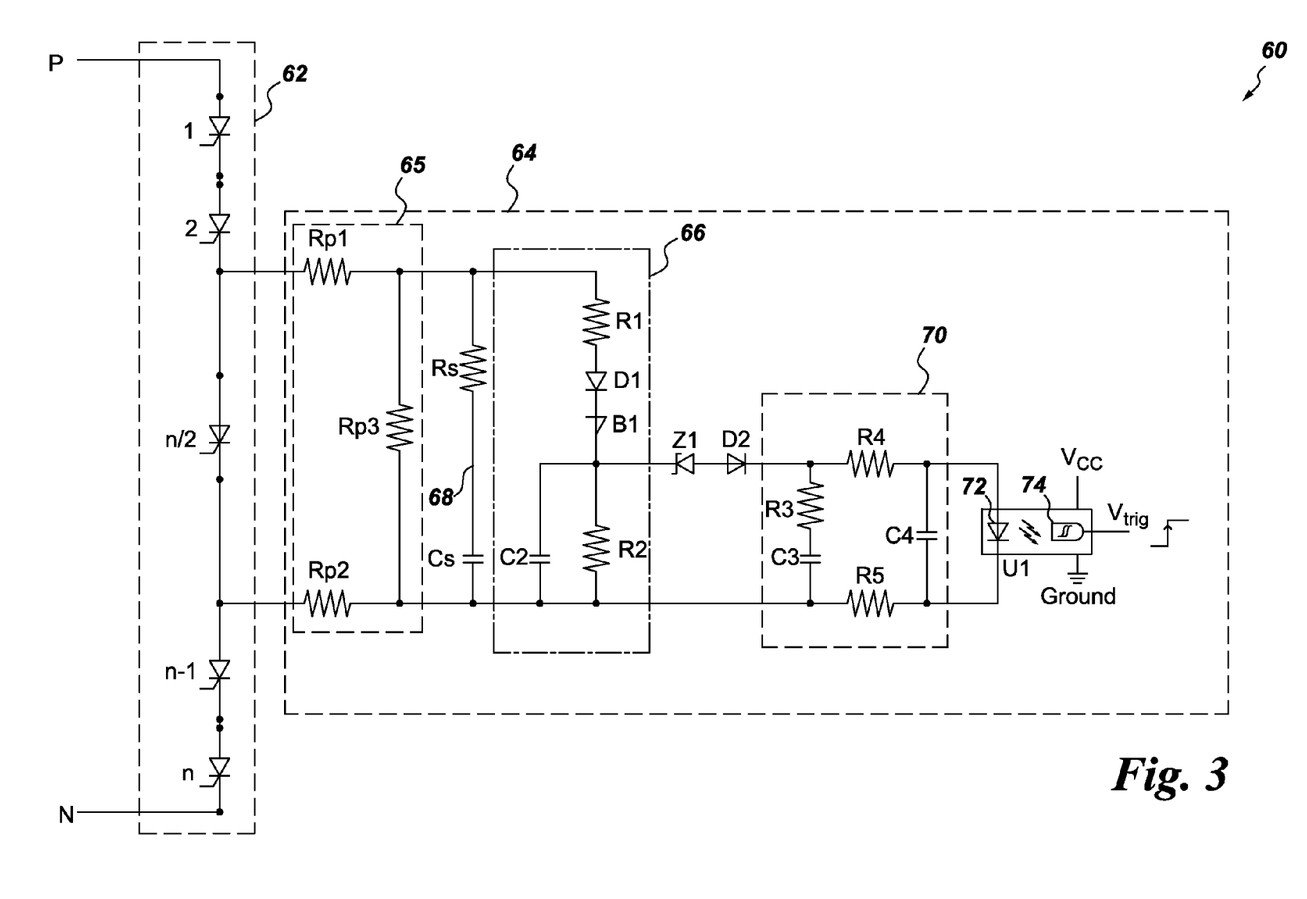
FIG. 3 represents a schematic diagram of an electronic valve with over-voltage detection circuit in accordance with one embodiment of the present technique.

FIG. 3 shows a schematic diagram 60 of an electronic valve 62 with over-voltage detection circuit 64. The electronic valve 62 is connected across terminals P-N to bypass any other circuit connected across terminals P-N in the event of an over-voltage. The electronic valve 62 includes series connection of semiconductor devices such as thyristors. In one embodiment, where there are n semiconductor devices in electronic valve 62, the over-voltage detection circuit 64 is connected across the semiconductor device which is at the center, namely n/2, n/2+1 or (n±1)/2. However, it should be noted that this is just an example and in other embodiments, the over-voltage detection circuit may be connected across other semiconductor devices.

Over-voltage detection Circuit 64 includes a voltage divider circuit 65 formed from resistors Rp1, Rp2 and Rp3 and provides a representative low voltage across a break-over diode B1 in a BOD branch 66. The representative low voltage is a representative of voltage across the semiconductor device to which circuit 64 is connected. The representative low voltage is significantly lower than the voltage across the semiconductor device to which circuit 64 is connected. For example, in one embodiment, if the voltage across terminals P-N is 50 kV and there are total 5 series connected semiconductor devices in electronic valve 62 then the voltage across each semiconductor device may be about 10 kV. Furthermore, the representative low voltage then may further be reduced to 10 V, as an example. Depending on resistances of resistors Rp1, Rp2, Rp3, R1 and R2, the representative low voltage will change. Thus, low voltage rating components such as a low voltage BOD can be used in the circuit 64. Furthermore, any isolation requirement for the circuit can be designed as in normal low voltage circuits/systems, which is the one of the advantage of the present technique. In one embodiment, resistance of resistors Rp1 and Rp2 is equal and is much larger than that of resistor Rp3. Since the power consumption of the resistors Rp1 and Rp2 may be comparatively high, in one embodiment, resistors Rp1 and Rp2 may be either mounted on a heat-sink or on a separate printed circuit board.

Over-voltage detection circuit 64 also includes a break-over diode branch 66 having the break-over diode B1, current limiting resistors R1, R2 and another diode D1 which are all connected in series and further a capacitor C2 in parallel with resistor R2. Diode D1 protects the break-over diode B1 against excessive reverse voltage. BOD branch 66 receives the representative low voltage from the voltage divider circuit formed by resistors Rp1, Rp2 and Rp3 and detects an over-voltage condition across the semiconductor device if the representative low voltage across break-over diode B1 exceeds a threshold value. In one embodiment, the threshold value is determined based on system requirements. For example, assume the rated voltage across terminals P-N is 50 kV and the maximum voltage the circuit connected across terminals P-N can withstand is 55 kV. In this case, assuming five semiconductor devices, maximum voltage each semiconductor device can withstand is 11 kV. Furthermore, the representative low voltage limit, assuming a ratio of 1000:1, would be 10V. Thus, the threshold value can then be determined based on resistances of resistors R1, R2 and the representative low voltage limit.

In one embodiment, capacitor C2 and resistor R2 form a low-pass filter which along with diode D1 blocks a displacement current of diode B1 at a positive dV/dt rate. In one embodiment, diode D1 is chosen to have fast recovery characteristics so as to protect against a reverse voltage across break-over diode B1. Circuit 64 further includes a snubber circuit 68 having resistor Rs and capacitor Cs to filter out high frequency noises. Snubber circuit 68 is connected in parallel with the BOD branch 66.

In one embodiment, break-over diode branch 66 provides a current to an optocoupler U1, when the over-voltage is detected. In other words, when the voltage across break-over diode B1 exceeds a threshold value, it starts conducting, creates a voltage across resistor R2 and provides a current to optocoupler U1. Optocoupler U1 then sends simultaneous signals to all self-powered gate drive circuits so that to trigger synchronized conduction of all semiconductor devices and short circuit terminals P-N which results in bypass of any power circuit connected across terminals P-N. Optocoupler U1 includes a light emitting diode 72 and a phototransistor 74. The optocoupler U1 is designed to work as voltage isolation between high-voltage bypass inputs and logic controller circuit which is usually at low voltage potential to ground. In one embodiment, optocoupler U1 has less than 200 ns propagation delay time and low input current. In addition, high performance of common mode noise rejection is preferable on optocoupler U1.

Circuit 64 also includes a filtering network 70 comprising resistors R3, R4, R5 and capacitors C4, C3 to drive optocoupler U1. Circuit 64 also includes a zener diode Z1 and a diode D2 connected in between filtering network 70 and BOD branch 66. Zener diode Z1 provides an onset voltage at which the filtering network 70 starts to operate, which helps to prevent faulty triggering of optocoupler U1 and also ensures that the filtering network 70 operates at same initial state before any occurrence of any over-voltage condition. Diode D2 is a fast recovery diode (optionally) to protect against the reverse voltage.

When the over-voltage pulse above the threshold value gets applied to the BOD B1, i.e. a BOD breakdown voltage, avalanche generation starts in BOD B1, providing a current (breakdown current) to charge capacitor C2 and then trigger the optocoupler U1. The component R2, C2 and D2 determine the waveform of the optocoupler LED current, resulting in a slightly delayed turn-on of the optocoupler. The output of optocoupler (Vtrig pulse as shown in FIG. 3) changes to a high level from a low level once an over-voltage is detected by BOD B1. The BOD current quickly goes below its holding current, after triggering all semiconductor devices, the BOD B1 will then turn off due to its current shunted by the semiconductor device to which the circuit 64 is connected. Usually the pulsewidth of Vtrig pulse could be several microseconds. Therefore, a latch circuit (e.g. D flip-flop) may be needed for saving the state of over-voltage detection until it is reset by an upstream controller after faults are coped with properly.

It should be noted that since all semiconductor devices will be triggered by a single pulse or signal Vtrig, the signal Vtrig may need to be duplicated and a multi-channel trigger signal for semiconductor devices may be generated. The multi-channel trigger signal can be a fiber signal generated by a fiber transmitter; or an electrical signal generated by isolated pulse transformers with multiple secondary windings, while its primary winding is driven by the amplified signal Vtrig. In one embodiment, a reinforced isolation barrier may be added between primary winding and secondary windings to meet high-voltage isolation requirement. In another embodiment, the control power for the function circuits i.e., pulse transformers etc. can be taken from self-powered gate drive and regulated loacally.

Figure 4:
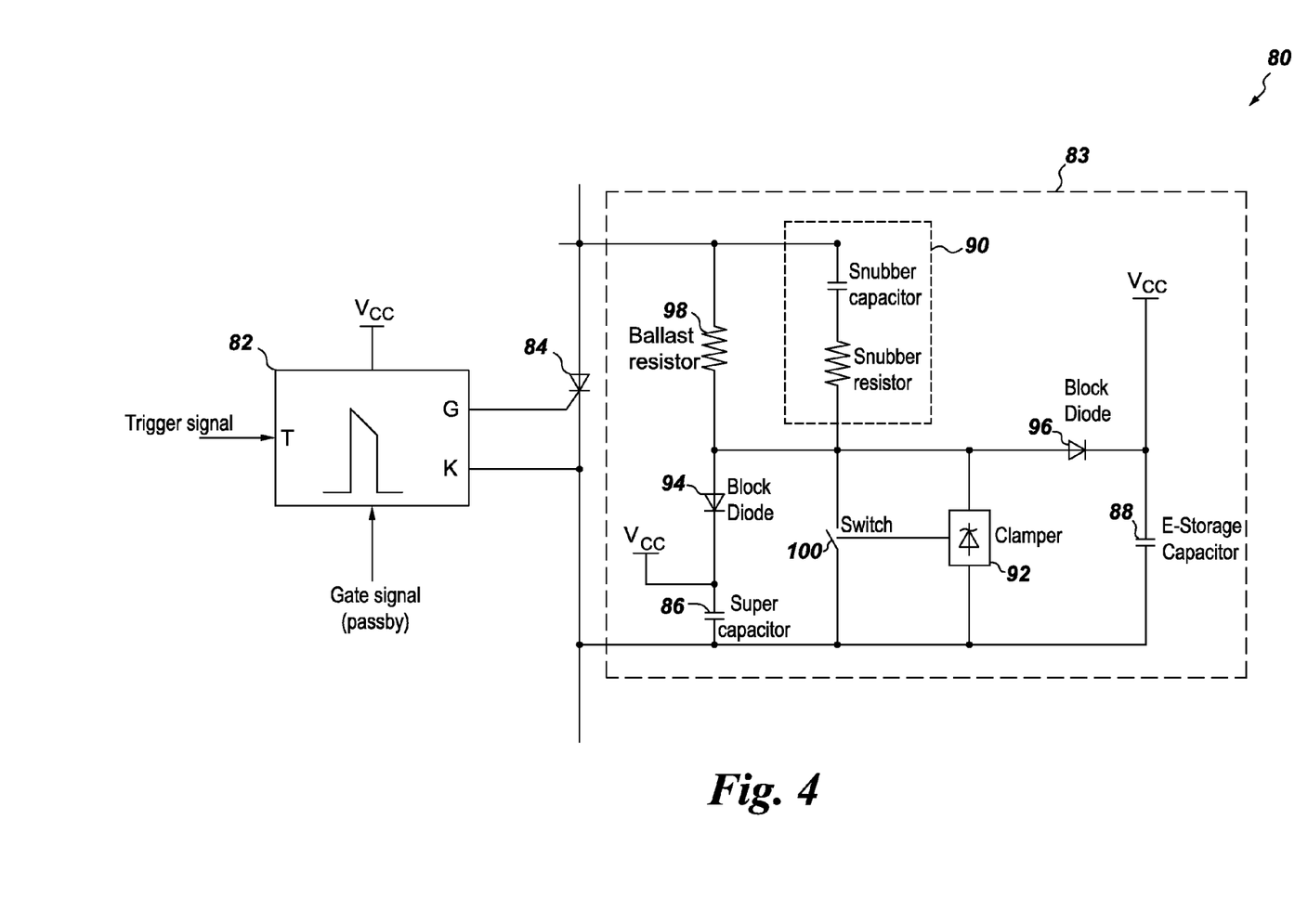
FIG. 4 is a schematic diagram of a self-powered gate drive in accordance with one embodiment of the present technique.

FIG. 4 shows a schematic diagram of a self-powered gate drive circuit 80 in accordance with an embodiment of the present technique. The Self powered gate drive circuit includes a gate drive circuit 82 with a power generation circuit 83. As discussed earlier, gate drive circuit 82 triggers a semiconductor device 84 when an over-voltage is detected by over-voltage detection circuit 64. Gate drive circuit 82 has been shown to have a voltage Vcc which is obtained from power generation circuit 83 which generates the voltage Vcc from 2 energy storage elements, a super capacitor 86 and a regular storage capacitor 88. During normal operation or steady state, the voltage across semiconductor device is utilized by a ballast resistor 98 to charge the super capacitor 86 and storage capacitor 88 and to generate voltage Vcc and derive a gating energy, i.e., the energy required to turn on the semiconductor device 84. In one embodiment, ballast resistor 98 is very large and charges capacitors 86 and 88 over much longer time with a very small current during steady state. In another embodiment, a hybrid energy recovery scheme may be used. In this scheme, along with ballast resistor, the gating energy may also be derived from a snubber circuit 90 at a steady state as well as a transient state. During the steady state the energy is transferred from high anode potential (usually >3 kV) to cathode-referenced potential of semiconductor device 84 and during the transient state, some transient alternating current may charge the snubber capacitor which then can transfer the energy to capacitors 86 and 88. The energy recovery scheme uses a capacitive divider formed by the snubber capacitor and the super capacitor or storage capacitor to recover charge during transits as well as the ballast resistor to charge the super capacitor over much large time period at steady state. The voltage of power generation circuit 83 is clamped to a low voltage level Vcc, for example 30 Vdc by a voltage clamper 92. Two block diodes 94 and 96 block a reverse current from capacitors 86 and 88 respectively. This is needed because when semiconductor switch 84 is conducting, it will bypass the power generation circuit 84 and thus, the block diodes 94 and 96 will protect the capacitors 86 and 88 from discharging. The snubber current will be bypassed by a power electronic switch 100 (such as MOSFET) controlled by voltage clamper 92 once the super capacitor 86 and storage capacitor 88 are fully charged to the pre-determined level of voltage Vcc. In one embodiment, voltage clamper 92 may be built by using a device with characteristics of zener diodes.

One of the advantages of the present technique is it needs no processors and precise analog circuits which complicate the design and reduce reliability. Furthermore, the over-voltage detection is conducted by break-over diode which is robust and insensitive to noises. The over-voltage trigger level can be precisely set by selecting break-over diode with associate break over-voltage in a wide variety of low-voltage BOD family, which results in noise-insensitive over-voltage detection, high repeatability of bypass performance and accuracy of over-voltage protection. Another advantage of the present technique is that turn-on of bypass semiconductor devices can be synchronized due to the same triggering signal being sent to all bypass semiconductor devices simultaneously. This would lead to little voltage unbalance on each bypass semiconductor device during transients and highly improve the reliability of overall bypass device. Furthermore, the mechanical circuit breaker will be controlled to close in coordination with semiconductor devices.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An over-voltage protection system comprising:
   an electronic valve connected across two terminals of a circuit, the electronic valve having a plurality of semiconductor devices connected in series;
   an over-voltage detection circuit connected across one of the plurality of semiconductor devices for detecting an over-voltage across the circuit, the over-voltage detection circuit comprising:
      a voltage divider circuit connected to a break-over diode in a way to provide a representative low voltage to the break-over diode, the representative low voltage representing a voltage across the one semiconductor device;
      an optocoupler configured to receive a current from the break-over diode when the representative low voltage exceeds a threshold voltage of the break-over diode indicating an over-voltage condition; and
   a plurality of self-powered gate drive circuits connected to the plurality of semiconductor devices, wherein the plurality of self-powered gate drive circuits receive over-voltage triggering pulses from the optocoupler during the over-voltage condition and switch on the plurality of semiconductor devices to bypass the circuit.

2. The over-voltage protection system of claim 1 further comprising a mechanical switch to bypass the circuit for a long duration after the circuit has been bypassed by the plurality of semiconductor devices in the electronic valve.

3. The over-voltage protection system of claim 2, wherein the electronic valve and the mechanical switch are open circuited during a non-fault condition.

4. The over-voltage protection system of claim 1, wherein the semiconductor devices include thyristors, insulated gate bipolar transistors (IGBT) or controllable semiconductor devices.

5. The over-voltage protection system of claim 1, wherein the break-over diode includes a low voltage break-over diode.

6. The over-voltage protection system of claim 1, wherein the over-voltage detection circuit is connected across about a center switching device of the plurality of switching devices.

7. The over-voltage protection system of claim 1, wherein the break-over diode is connected in series with a low-pass filter to form a break-over diode branch, the low pass filter configured to block a displacement current of the break-over diode.

8. The over-voltage protection system of claim 7 further comprising a snubber circuit connected in parallel to the break-over diode branch to filter out high frequency noises.

9. The over-voltage protection system of claim 8 comprising a filtering network connected between the optocoupler and the break-over diode branch and configured to drive the optocoupler.

10. The over-voltage protection system of claim 1, wherein the self-powered gate drive circuit of each of the semiconductor switches includes a power generation circuit which generates a voltage from a storage capacitor in parallel with a super capacitor.

11. The over-voltage protection system of claim 10, wherein the storage capacitor and the super capacitor are charged by a ballast resistor of the power generation circuit.

12. The over-voltage protection system of claim 11, wherein the power generation circuit includes a voltage clamper to clamp the voltage across the storage capacitor.

13. The over-voltage protection system of claim 11, wherein the power generation circuit receives energy from the respective open-circuited semiconductor device during a non-fault condition.

14. A method of bypassing a circuit during an over-voltage, the method comprising:
  connecting an electronic valve across two terminals of a circuit, the electronic valve formed by connecting a plurality of semiconductor devices in series;
  providing an over-voltage detection circuit across one of the plurality of semiconductor devices to detect an over-voltage across the circuit, wherein detecting the over-voltage includes:
    providing a representative low voltage representing a voltage across the one semiconductor device to a break-over diode by connecting a voltage divider circuit across the semiconductor device;
    receiving a current at an optocoupler from the break-over diode when the representative low voltage exceeds a threshold voltage of the break-over diode indicating an over-voltage condition; and
  utilizing the optocoupler for providing over-voltage triggering pulses to self-powered gate drive circuits of the plurality of semiconductor devices for turning on the plurality of semiconductor devices of the electronic valve to bypass the circuit during the over-voltage condition.

15. The method of claim 14 further comprising switching on a mechanical switch connected across the circuit to bypass the circuit for a long duration after initial bypass by the electronic valve.

16. The method of claim 14, wherein providing an over-voltage detection circuit includes connecting the over-voltage detection circuit across about a center switching device of the plurality of switching devices.

17. The method of claim 15 further comprising connecting a low-pass filter in series with the break-over diode to form a break-over diode branch and to block a displacement current of the break-over diode.

18. The method of claim 17 further comprising connecting a snubber circuit in parallel to the break-over diode branch to filter out high frequency noises.

19. The method of claim 14, wherein the self-powered gate drive circuit of each of the semiconductor switches includes a power generation circuit which generates a voltage from a storage capacitor in parallel with a super capacitor.

20. The method of claim 19 comprising charging the storage capacitor and the super capacitor by a ballast resistor of the power generation circuit.

* * * * *